US006997079B2

(12) United States Patent
Nomura et al.

(10) Patent No.: US 6,997,079 B2
(45) Date of Patent: Feb. 14, 2006

(54) GEAR MECHANISM WITH AN IDLER GEAR, A GEAR MECHANISM WITH A DEVICE FOR ELIMINATING BACKLASH BETWEEN GEARS, AND A MOTOR DRIVING MECHANISM

(75) Inventors: Hiroshi Nomura, Saitama (JP); Maiko Takashima, Tokyo (JP)

(73) Assignee: PENTAX Corporation, Tokyo (JP)

( * ) Notice: Subject to any disclaimer, the term of this patent is extended or adjusted under 35 U.S.C. 154(b) by 73 days.

(21) Appl. No.: 10/198,359

(22) Filed: Jul. 19, 2002

(65) Prior Publication Data

US 2003/0015051 A1 Jan. 23, 2003

(30) Foreign Application Priority Data

Jul. 23, 2001 (JP) .............................. 2001-221675

(51) Int. Cl.
*F16H 57/00* (2006.01)
*F16H 55/18* (2006.01)
*F16H 55/00* (2006.01)

(52) U.S. Cl. .......................... 74/440; 74/409; 74/406; 74/432

(58) Field of Classification Search ................. 74/409, 74/439, 440, 443, 445, 406, 431, 432, 433, 74/567, 568 R, 569
See application file for complete search history.

(56) References Cited

U.S. PATENT DOCUMENTS

| | | | |
|---|---|---|---|
| 2,440,901 A * | 5/1948 | Larson ......................... 74/409 |
| 3,035,454 A * | 5/1962 | Luning ......................... 74/440 |
| 3,648,534 A * | 3/1972 | Fagarazzi ..................... 74/440 |
| 4,189,951 A * | 2/1980 | Sauter .......................... 74/440 |
| 4,739,670 A * | 4/1988 | Tomita et al. ................ 74/409 |
| 4,747,321 A * | 5/1988 | Hannel ......................... 74/440 |
| 5,056,613 A * | 10/1991 | Porter et al. ................ 180/178 |
| 5,485,315 A | 1/1996 | Nomura et al. |
| 5,492,029 A * | 2/1996 | Obrist .......................... 74/409 |
| 5,543,971 A | 8/1996 | Nomura et al. |
| 5,557,983 A * | 9/1996 | Hara et al. ................ 74/568 R |
| 5,642,232 A | 6/1997 | Nomura et al. |
| 5,870,928 A * | 2/1999 | Genter et al. ................. 74/440 |
| 5,934,144 A * | 8/1999 | Marinkovic .................. 74/440 |

FOREIGN PATENT DOCUMENTS

JP 59026662 A * 2/1984

* cited by examiner

*Primary Examiner*—David Fenstermacher
*Assistant Examiner*—Colby Hansen
(74) *Attorney, Agent, or Firm*—Greenblum & Bernstein, P.L.C.

(57) ABSTRACT

A gear mechanism includes a driving gear, a driven gear, and an idler gear which is in mesh with the driving gear and the driven gear, wherein rotation of the driving gear is transferred to the driven gear via the idler gear. The idler gear includes first and second spur gears which are positioned adjacent to each other in an axial direction and are generally centered about a common axis, radial teeth of the first and second spur gears each being the same in shape, pitch and the number of teeth, and the first and second spur gears being biased to rotate in opposite directions. The first and second spur gears are connected so as to be relatively movable in a radial direction normal to the axial direction while maintaining the first and second spur gears in mesh with the driving gear and the driven gear.

33 Claims, 4 Drawing Sheets

GEAR MECHANISM WITH AN IDLER GEAR, A GEAR MECHANISM WITH A DEVICE FOR ELIMINATING BACKLASH BETWEEN GEARS, AND A MOTOR DRIVING MECHANISM

BACKGROUND OF THE INVENTION

1. Field of the Invention

The present invention relates to a gear mechanism, specifically to a gear mechanism with a device for eliminating backlash between gears. The present invention also relates to a gear mechanism with an idler gear which eliminates backlash between gears. The present invention further relates to motor driving mechanism having a power train using gears.

2. Description of the Related Art

A gear train is often used as a power train in various devices. Backlash between adjacent gears becomes a cause of a reduction in power transmission efficiency and also a cause of the occurrence of noise, and is preferably eliminated if possible. Various methods of eliminating such backlash are known in the art. For instance, a composite gear device having a backlash eliminating capability is known in the art. Such a composite gear device is provided with a composite gear having coaxially arranged two adjacent gears which are biased in opposite rotational directions by a spring. According to this composite gear device, respective radial teeth of the two adjacent gears of the composite gear clasp radial teeth of one or more associated gears which are in mesh with the composite gear to eliminate backlash. However, at least one spring is necessary in addition to the two adjacent gears in such a composite gear device. This increases the number of elements of the composite gear device, the cost of production and the number of manufacturing steps.

In a gear mechanism provided with a driving gear, a driven gear and an idler gear positioned between the driving gear and the driven gear, it is sometimes the case that the amount of backlash between the driving gear and the idler gear is different from the amount of backlash between the driven gear and the idler gear. In this case, it is difficult to reliably eliminate the two backlashes at a time.

In recent years motor driving systems using a stepper motor have been widely used. For instance, a stepper motor is often used as a driving device of a zooming or focusing system of a camera. The stepper motor rotates in angular movements rather than continuously. Therefore, if a gear train is arranged in a power train of the stepper motor, the noise generated by backlash between gears of the gear train becomes conspicuous. This problem can be reduced to some extent by electrically controlling the operation of the stepper motor. However, the cost of electrical components for achieving such an electrical control is high. Accordingly, in the case where a stepper motor is used as zooming motor or a focusing motor of a camera, it is generally the case that the stepper motor is designed so that a feed-screw shaft (lead screw) serving as a drive shaft of the stepper motor projects directly from the stepper motor while a driven movable element such as a driven gear is engaged with the feed-screw shaft. However, according to this arrangement, the length of the motor driving system in an axial direction of the feed-screw shaft tends to be long because the stepper motor and the feed-screw shaft are aligned in the axial direction of the feed-screw shaft. Accordingly, it is desirable to solve the noise problem and the problem increasing the size of the motor driving system while reducing the cost of production, specifically in the motor driving system using stepper motor.

SUMMARY OF THE INVENTION

Backlash in a gear mechanism with an idler gear is reliably eliminated according to the present invention. The present invention provides a low-cost gear mechanism for eliminating backlash between gears, wherein the number of elements of the gear mechanism is minimal. A space-efficient motor driving mechanism with a power train using gears wherein backlash between the gears is eliminated with a low-cost structure is also achieved.

For example, a gear mechanism is provided, including a driving gear, a driven gear, and an idler gear which is in mesh with the driving gear and the driven gear, wherein rotation of the driving gear is transferred to the driven gear via the idler gear. The idler gear includes a first spur gear and a second spur gear which are positioned adjacent to each other in an axial direction and are generally centered about a common axis, radial teeth of the first spur gear and radial teeth of the second spur gear being the same in shape, pitch and the number of teeth, and the first spur gear and the second spur gear being biased to rotate in opposite directions. The first spur gear and the second spur gear are connected so as to be relatively movable in a radial direction normal to the axial direction while maintaining the first spur gear and the second spur gear in mesh with the driving gear and the driven gear.

The first spur gear can rotate at a fixed position without moving in a plane normal to the rotational axis thereof, and the second spur gear can rotate at an unfixed position relative to the first spur gear in a plane normal to the rotational axis of the first spur gear.

It is desirable for the first spur gear to include a cylindrical rib centered about the rotational axis thereof, and for the second spur gear to include a circular opening in which the cylindrical rib is loosely fitted, a range of movement of the second spur gear in the radial directions with respect to the first spur gear being defined by a gap between an inner peripheral surface of the second spur gear in the circular opening and an outer peripheral surface of the cylindrical rib.

The range of movement of the second spur gear can be predetermined to cover the possible maximum difference between the amount of backlash between the driving gear and the idler gear and the amount of backlash between the driven gear and the idler gear.

It is desirable for the gear mechanism to further include a biasing device which biases the first spur gear and the second spur gear to rotate in the opposite directions, the biasing device including at least one resilient arm formed on one of the first spur gear and the second spur gear, one end of the resilient arm being integral with the one of the first spur gear and the second spur gear, the other end of the resilient arm serving as a free end, wherein the resilient arm is deformable resiliently in a direction to move the free end in a radial direction; and at least one arm-engaging recess formed on the other of the first spur gear and the second spur gear so that an engaging protrusion formed on the free end of the resilient arm is engaged in the arm-engaging recess, the arm-engaging recess including a resilient arm bending portion extending in a direction inclined to a circumferential direction of the other of the first spur gear and the second spur gear. The radial teeth of the first spur gear and the radial teeth of the second spur gear overlap each other in a circumferential direction of the idler gear when the idler gear is in a free state when the idler gear is disengaged from the driving gear and the driven gear. The free end of the resilient arm moves in the resilient arm bending portion of the arm-engaging recess therealong to deform the resilient arm to thereby bias the first spur gear and the second spur gear to rotate in the opposite directions when the driving gear and the driven gear are brought into mesh with the idler gear with respective tooth traces of the first spur gear and the second spur gear being substantially aligned with each other.

The first spur gear can include a pair of the resilient arms, having the same shape and size, which are symmetrically arranged about an axis of the first spur gear, each of the pair of resilient arms being elongated in a circumferential direction of the first spur gear. The second spur gear can include a pair of the arm-engaging recesses, having the same shape and size, which are symmetrically arranged about an axis of the second spur gear.

The arm-engaging recess can include a wide-width portion allowing at least a portion of the engaging protrusion of the resilient arm to be inserted into the arm-engaging recess, and a narrow-width portion which prevents the engaging protrusion from coming out of the arm-engaging recess, the narrow-width portion including the resilient arm bending portion.

It is desirable for the resilient arm to be resiliently deformable in the axial direction of the first spur gear while maintaining the first spur gear and the second spur gear in mesh with the driving gear and the driven gear.

It is desirable for the engaging protrusion to be positioned in the arm-engaging recess within a thickness of the idler gear in an axial direction thereof in a state wherein the first spur gear and the second spur gear are coupled to each other.

It is desirable for the driving gear and the driven gear to be arranged on opposite sides of the idler gear to be symmetrical with respect to rotational axis of the idler gear.

The driving gear can be driven by a stepper motor.

The gear mechanism can be incorporated in a camera to serve as a backlash eliminating mechanism of an auto-focus system.

The gear mechanism can be incorporated in a focusing lens driving system of a camera.

In another embodiment, a device for eliminating backlash between two gears meshing with each other is provided, wherein one of the two gears includes a first spur gear and a second spur gear which are positioned adjacent to each other in an axial direction and generally centered about a common axis, radial teeth of the first spur gear and radial teeth of the second spur gear being identical in shape, pitch and the number of teeth. The backlash eliminating device can include a biasing device which biases the first spur gear and the second spur gear to rotate in opposite directions, the biasing device including at least one resilient arm formed on one of the first spur gear and the second spur gear, one end of the resilient arm being integral with the one of the first spur gear and the second spur gear, the other end of the resilient arm serving as a free end, wherein the resilient arm is deformable resiliently in a direction to move the free end in a radial direction; and at least one arm-engaging recess formed on the other of the first spur gear and the second spur gear so that an engaging protrusion formed on the free end of the at least one resilient arm is engaged in the arm-engaging recess, the arm-engaging recess including a resilient arm bending portion extending in a direction inclined to a circumferential direction of the other of the first spur gear and the second spur gear. The radial teeth of the first spur gear and the radial teeth of the second spur gear overlap each other in a circumferential direction of the idler gear when the idler gear is in a free state wherein the idler gear is disengaged from the other of the two gears. The free end of the resilient arm moves in the resilient arm bending portion of the arm-engaging recess therealong to deform the resilient arm to thereby bias the first spur gear and the second spur gear to rotate in the opposite directions when the other of the two gears is brought into mesh with the idler gear with respective tooth traces of the first spur gear and the second spur gear being substantially aligned with each other.

It is desirable for the first spur gear to include a pair of the resilient arms having the same shape and size which are symmetrically arranged about an axis of the first spur gear, each of the pair of resilient arms being elongated in a circumferential direction of the first spur gear; and for the second spur gear to include a pair of the arm-engaging recesses having the same shape and size which are symmetrically arranged about an axis of the second spur gear.

It is desirable for the engaging protrusion of the resilient arm to include a cylindrical base portion engaged in the resilient arm bending portion to be movable therein, and a large-diameter end positioned at an end of the cylindrical base portion, the large-diameter end being greater than the cylindrical base portion in diameter. An engagement of the large-diameter end with the resilient arm bending portion and a portion of the arm-engaging recess in the vicinity of the resilient arm bending portion prevents the first spur gear and the second spur gear from disengaging from each other in the axial direction.

The arm-engaging recess can further include a wide-width portion which communicates with the resilient arm bending portion and which allows the large-diameter end to be inserted in the wide-width portion. The first spur gear and the second spur gear can be disengaged from each other in the axial direction when the large-diameter end is positioned in the wide-width portion.

The arm-engaging recess can further include a curved portion provided between the wide-width portion and the resilient arm bending portion, the curved portion applying a resistance to the engaging protrusion when the engaging protrusion passes along the curved portion to move from the resilient arm bending portion to the wide-width portion.

It is desirable for the resilient arm to be resiliently deformable not only in the radial direction but also in the axial direction.

It is desirable for the first spur gear and the second spur gear to be connected so as to be relatively movable in a radial direction normal to the common axis while maintaining the first spur gear and the second spur gear in mesh with the other of the two gears.

The first spur gear and the second spur gear can constitute an idler gear, the other of the two gears serving as one of a driving gear and a driven gear which is in mesh with the idler gear.

It is desirable for the driving gear and the driven gear to be arranged on opposite sides of the idler gear to be symmetrical with respect to rotational axis of the idler gear.

The two gears can be incorporated in a camera.

According to another embodiment, a motor driving mechanism is provided, having a driving gear, a driven gear and an idler gear which is in mesh with the driving gear and the driven gear, rotation of the driving gear being transferred to the driven gear via the idler gear, the driving gear being driven by a motor rotation of the driven gear causing a driven member to move, wherein the idler gear includes a first spur gear and a second spur gear which are positioned adjacent to each other in an axial direction and generally centered about a common axis, radial teeth of the first spur gear and radial teeth of the second spur gear having the same shape, pitch and the number of teeth, the first spur gear and the second spur gear being biased to rotate in opposite directions. The first spur gear and the second spur gear are connected so as to be relatively movable in a radial direction normal to the axial direction while maintaining the first spur gear and the second spur gear in mesh with the driving gear and the driven gear.

The motor can be a stepper motor.

The driven member can be a lens support frame which supports a focusing lens group of a camera.

It is desirable for the driving gear and the driven gear to be arranged on opposite sides of the idler gear to be symmetrical with respect to a rotational axis of the idler gear.

According to another embodiment, a motor driving mechanism is provided, having a motor and two gears meshing with each other, rotation of the motor being transferred to a driven member via the two gears, wherein one of the two gears includes a first spur gear and a second spur gear which are positioned adjacent to each other in an axial direction and generally centered about a common axis, radial teeth of the first spur gear and radial teeth of the second spur gear having the same shape, pitch and the number of teeth. The motor driving mechanism can include a biasing device which biases the first spur gear and the second spur gear to rotate in opposite directions, the biasing device including at least one resilient arm formed on one of the first spur gear and the second spur gear, one end of the resilient arm being integral with the one of the first spur gear and the second spur gear, the other end of the resilient arm serving as a free end, wherein the resilient arm is deformable resiliently in a direction to move the free end in a radial direction; and at least one arm-engaging recess formed on the other of the first spur gear and the second spur gear so that an engaging protrusion formed on the free end of the resilient arm is engaged in the arm-engaging recess, the arm-engaging recess including a resilient arm bending portion extending in a direction inclined to a circumferential direction of the other of the first spur gear and the second spur gear. The radial teeth of the first spur gear and the radial teeth of the second spur gear overlap each other in a circumferential direction of the idler gear when the idler gear is in a free state where the idler gear is disengaged from the other of the two gears. The free end of the resilient arm moves in the resilient arm bending portion of the arm-engaging recess therealong to deform the resilient arm to thereby bias the first spur gear and the second spur gear to rotate in the opposite directions when the other of the two gears is brought into mesh with the idler gear with respective tooth traces of the first spur gear and the second spur gear being substantially aligned with each other.

The motor can be a stepper motor.

The driven member can be a lens support frame which supports a focusing lens group of a camera.

According to another embodiment, an idler gear having a first spur gear and a second spur gear is provided, the first spur gear including an axial cylindrical rib centered about an axis of the first spur gear; the second spur gear including an axial circular opening in which the cylindrical rib is loosely fitted so that the second spur gear is rotatable about the cylindrical rib relative to the first spur gear. Radial teeth of the first spur gear and radial teeth of the second spur gear are the same in shape, pitch and the number of teeth. The idler gear includes at least one spring member which biases the first spur gear and the second spur gear to rotate in opposite directions, the spring member being formed integral with one of the first spur gear and the second spur gear.

The present disclosure relates to subject matter contained in Japanese Patent Application No.2001-221675 (filed on Jul. 23, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
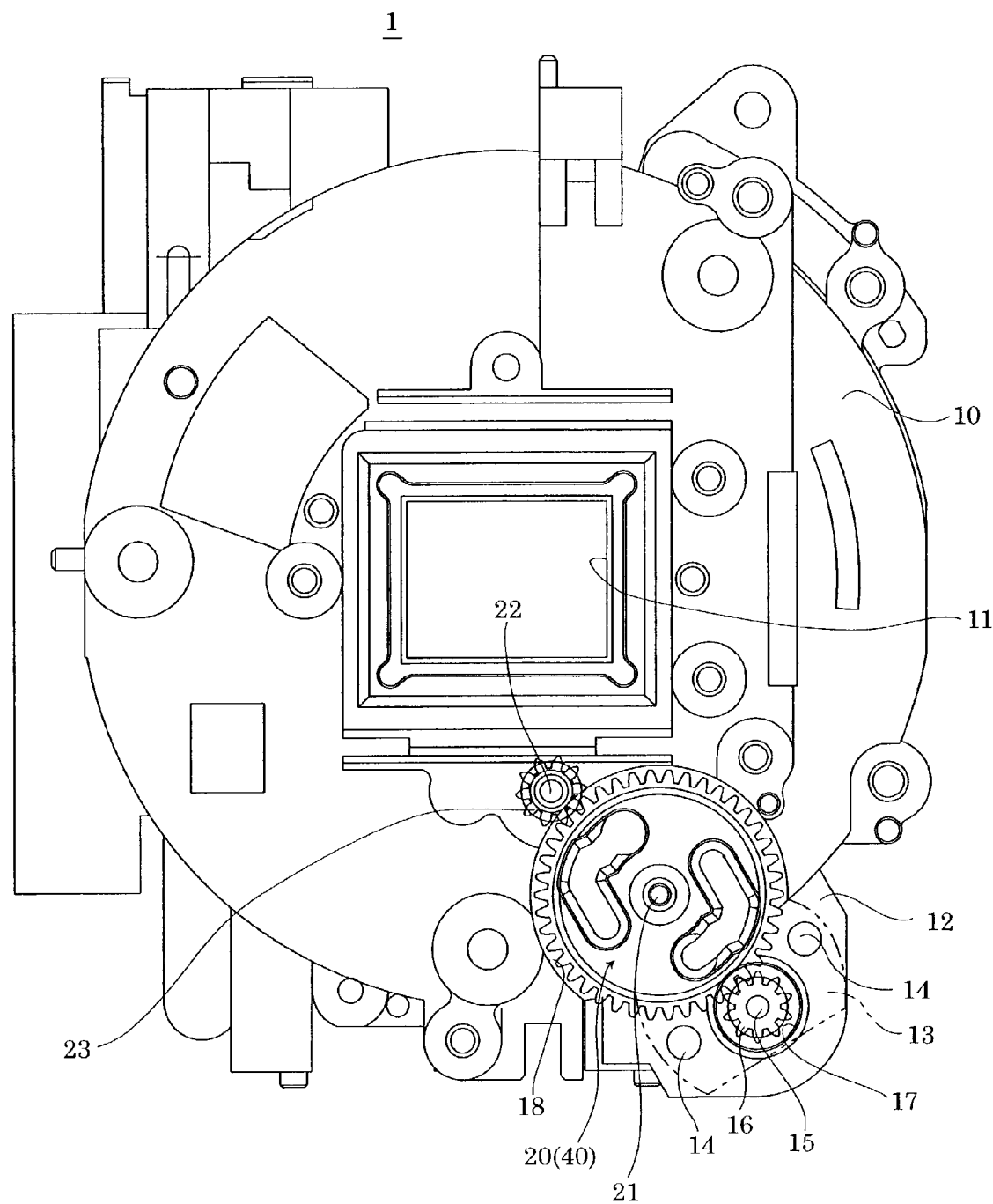
FIG. 1 is a front elevational view of an AF unit having an embodiment of a gear mechanism according to the present invention, wherein the gear mechanism has a driving gear, a driven gear and an idler gear positioned between the driving gear and the driven gear.

An AF (auto-focus) unit having an embodiment of a gear mechanism according to the present invention will be hereinafter discussed. FIG. 1 shows a front elevational view of the AF unit.

The AF unit 1 is provided with a mount base 10 having a rectangular photographing aperture 11 at the center of the mount base 10. Light bundles which are passed through a photographing lens system (not shown) are incident on a light receiving surface of an image pick-up element (not shown) through the photographing aperture 11. The AF unit 1 is incorporated in a digital camera using an image pick-up element such as a CCD. However, the AF unit 1 can be incorporated in any other type camera such as a conventional camera using light-sensitive film. In addition, the image pick-up element can be any known type.

The mount base 10 is provided with a bracket 12 to which an AF motor 13 is fixed by set screws 14. The AF motor 13 is a stepper motor whose drive shaft 15 rotates in small steps. The drive shaft 15 projects from the AF motor 13 in a direction parallel to the optical axis of the photographing lens system (in a direction perpendicular to the page of FIG. 1). A motor pinion 16 serving as a driving gear is fixed on the drive shaft 15. The mount base 10 is provided on the bracket 12 with a small accommodation recess 17 which accommodates the motor pinion 16 therein. The mount base 10 is provided adjacent to the small accommodation recess 17 with a large accommodation recess 18 which accommodates an idler gear 20. The idler gear 20 is rotatably fitted on a pivot 21 which projects from the mount base 10 to be substantially parallel to the drive shaft 15. The idler gear 20 stays in mesh with the motor pinion 16. The idler gear 20 stays in mesh with a driven gear 23. The driven gear 23 is fixedly fitted on a rotational shaft 22 which extends parallel to the pivot 21 and the drive shaft 15. The motor pinion 16, the idler gear 20 and the drive gear 23 are fundamental elements of the present embodiment of the gear mechanism of the AF unit 1.

The radial teeth of the driven gear 23 are the same as the radial teeth of the motor pinion 16 in shape, pitch (the distance between a point on a gear tooth and a corresponding point on the next tooth) and the number of teeth. The motor pinion 16 and the driven gear 23 are arranged on opposite sides of the idler gear 20 to be symmetrical with respect to the pivot 21. Namely, the pivot 21 of the idler gear 20, the drive shaft 15 and the rotational shaft 22 are aligned in a single plane and extend parallel to one another. In other words, the driven gear 23 is located at a position with an angular displacement of 180 degrees about the pivot 21 from the position of the motor pinion 16. Forward and reverse rotations of the driven gear 23 cause a feed-screw shaft (not shown) to rotate forward and reverse, respectively. A lens support frame (driven member) which supports a focusing lens group of the photographing lens system and which is guided in the optical axis direction of the photographing lens system is in mesh with the feed-screw shaft, so that the lens support frame moves along the optical axis by rotation of the feed-screw shaft. Therefore, rotation of the drive shaft 15 (the motor pinion 16) of the AF motor 13 causes the driven gear 23 to rotate via the idler gear 20, which in turn moves the focusing lens group along the optical axis of the photographing lens system. The rotation of the AF motor 13 determines whether the focusing lens group is driven forward or reverse. Although a focusing controller for determining the amount of driving of the focusing lens group and the direction of driving of the focusing lens group is not herein discussed, such a focusing controller is well known in the art. Therefore, the AF unit 1 can adopt any conventional focusing controller.

In the illustrated embodiment of the gear mechanism, the AF motor 13 provided in the AF unit 1 is a stepper motor. The AF motor 13 is not directly coupled to the aforementioned feed-screw shaft. The AF motor 13 is connected to the aforementioned feed-screw shaft via a power train using gears positioned between the AF motor 13 and the feed-screw shaft. Therefore, the length of the motor driving system in an axial direction of the drive shaft 15 of the AF motor 13 is reduced compared to a conventional construction wherein the stepper motor and the feed-screw shaft are aligned in the axial direction of the feed-screw shaft, which has reduced the size of the camera, especially in the forward and rearward direction of the camera. On the other hand, as discussed above in the description of the related art, if a gear train is arranged in a power train of a stepper motor serving as AF motor, the noise generated by backlash between gears of the gear train becomes more conspicuous with a greater loss of driving force of the AF motor in the focusing operation than the case where a motor which rotates continuously serves as an AF motor, since the AF motor is actuated and stopped at frequent intervals in the focusing operation. One solution to prevent this problem from occurring is to reduce the rotational speed of the AF motor each time the operating state of the AF motor is changed. However, it is costly to provide a controller for controlling the rotational speed of the AF motor in such a manner. In the AF unit 1 having the present embodiment of the gear mechanism according to the present invention, backlash is eliminated by a mechanical structure of the idler gear 20 without requiring electrical control.

Figure 2:
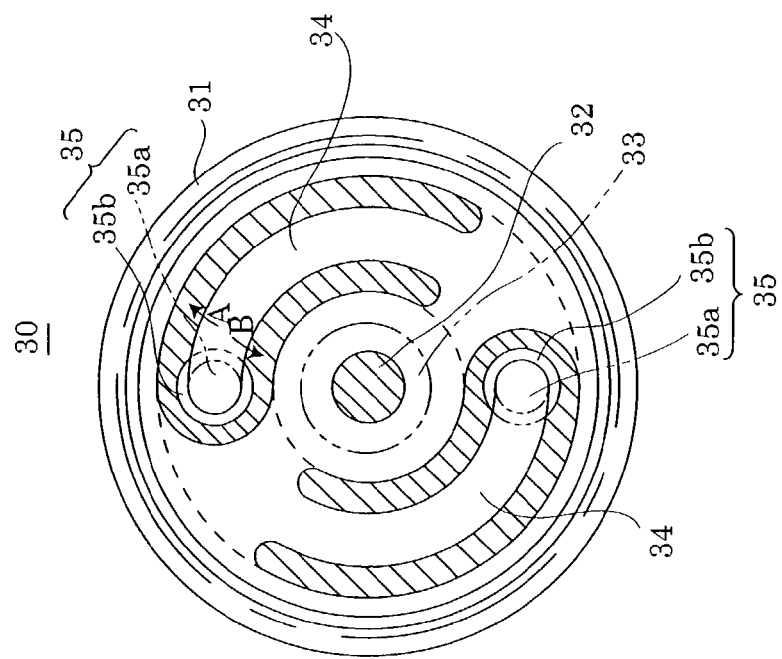
FIG. 2 is a front elevational view of a main gear serving as an element of the idler gear shown in FIG. 1.
Figure 3:
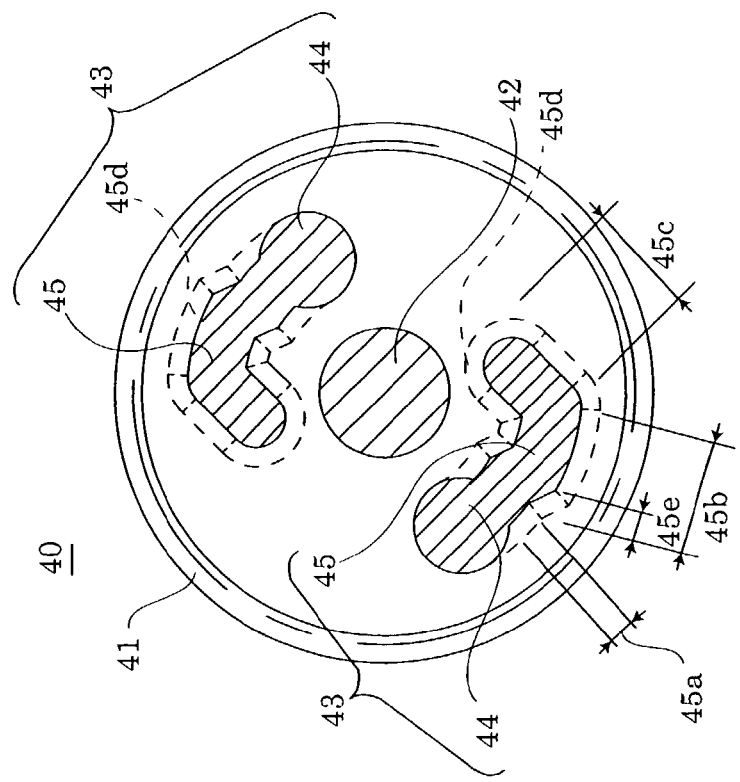
FIG. 3 is a front elevational view of a sub-gear serving as an element of the idler gear shown in FIG. 1.
Figure 4:
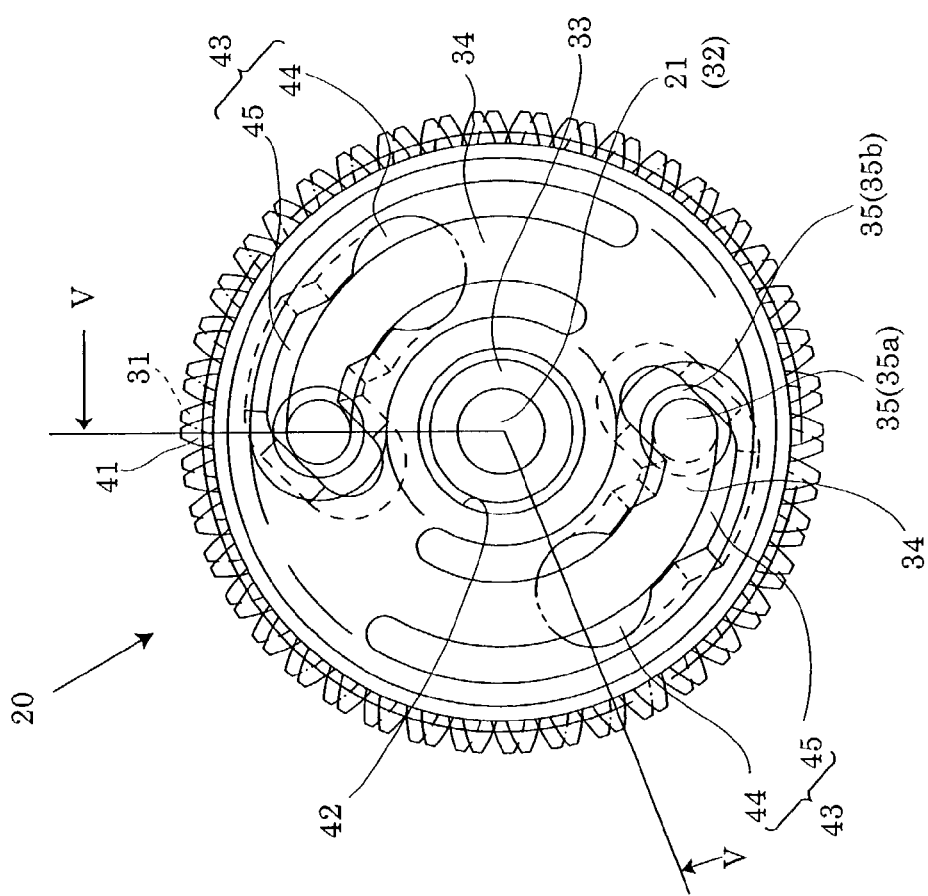
FIG. 4 is a front elevational view of the idler gear that is completed by coupling the sub-gear shown in FIG. 3 to the main gear shown in FIG. 2.

As shown in FIG. 4, the idler gear 20 includes a main gear (first spur gear) 30 and a sub-gear (second spur gear) 40. Each of the main gear 30 and the sub-gear 40 is a spur gear, which has radial teeth parallel to the axis of the gear. Note that the main gear 30 is not shown in FIG. 1 for the purpose of illustration. In each of FIGS. 2 and 3 which show the shapes of the main gear 30 and the sub-gear 40, cross-hatched portions indicate through holes formed on the gear which extend parallel to the axis of the gear.

The main gear 30 formed as a spur gear is provided on an outer periphery thereof with radial teeth 31 parallel to the axis of the main gear 30. Likewise, the sub-gear 40 formed as a spur gear is provided on an outer periphery thereof with radial teeth 41 parallel to the axis of the sub-gear 40. The addendum circle of the main gear 31 is the same as the addendum circle of the sub-gear 40. The radial teeth 31 of the main gear 30 and the radial teeth 41 of the sub-gear 40 are the same in shape, pitch (the distance between a point on a gear tooth and a corresponding point on the next tooth) and the number of teeth. Namely, the radial teeth 31 of the main gear 30 and the radial teeth 41 of the sub-gear 40 have the same in structure and size.

Figure 5:
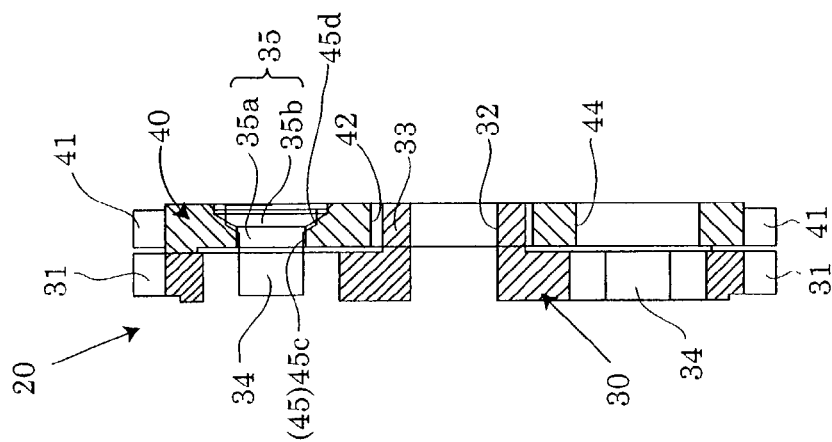
FIG. 5 is a cross sectional view taken along the V—V line shown in FIG. 4.

The main gear 30 is made of, e.g., synthetic resin, and is provided at a center thereof with an axial hole 32 having a circular cross section. The inside diameter of the axial hole 32 is substantially the same as the diameter of the pivot 21 that is provided on the mount base 10. The pivot 21 is fitted in the axial hole 32 with a minimum clearance so that the main gear 30 can freely rotate about the pivot 21. The main gear 30 is provided on a surface thereof facing the sub-gear 40 with a cylindrical rib 33 which is centered about the axis of the axial hole 32 and is formed around the axial hole 32 to extend in the axial direction thereof. The main gear 30 is provided around the cylindrical rib 33 with a pair of resilient arms 34 having the same shape and size as each other. The pair of resilient arms 34 are symmetrically arranged about the axis of the main gear 30, and each resilient arm 34 is elongated in a circumferential direction of the main gear 20. Each resilient arm 34 is formed by cutting out a part of the disk portion of the main gear 30. One end of each resilient arm 34 is integral with the main gear 30, and the other end of each resilient arm 34 is provided as a free end. Each resilient arm 34 can be deformed resiliently in a direction to move the free end of the resilient arm 34 in a radial direction of the main gear 30 and also in the axial direction of the main gear 30 (i.e., in a direction parallel to the axis of the main gear 30). Each resilient arm 34 is provided, at the free end thereof on a surface facing the sub-gear 40, with an engaging protrusion 35. The engaging protrusion 35 includes a cylindrical base portion 35a and a large-diameter end 35b positioned at the end of the cylindrical base portion 35a. As can be seen in FIG. 5, the large-diameter end 35b is greater than the cylindrical base portion 35a in diameter. The pair of resilient arms 34 are symmetrically arranged about the axis of the main gear 30, and accordingly, the pair of engaging protrusions 35 are also symmetrically arranged about the axis of the main gear 30.

Similar to the main gear 30, the sub-gear 40 is made of synthetic resin. The sub-gear 40 is provided at the axial center thereof with a circular opening 42. The inside diameter of the circular opening 42 is greater than the outside diameter of the cylindrical rib 33 by a predetermined amount. The sub-gear 40 is provided around the circular opening 42 with a pair of through holes (arm-engaging recesses) 43 having the same shape and size as each other. The pair of through holes 43 are symmetrically arranged about the axis of the sub-gear 40 (i.e., the axis of the circular opening 42). Each through hole 43 includes a wide-width portion 44 and a narrow-width portion 45. The width of the wide-width portion 44 is determined to allow the large-diameter end 35b to be inserted into the wide-width portion 44. The width of the narrow-width portion 45 is determined so as not to allow the large-diameter end 35b to be inserted into the narrow-width portion 45, but to allow only the cylindrical base portion 35a to be engaged in the narrow-width portion 45. The narrow-width portion 45 includes a leading portion 45a, a curved portion 45b and a bending portion (resilient arm bending portion) 45c, in that order in a counterclockwise direction as viewed in FIG. 3. The leading portion 45a is communicatively connected with the wide-width portion 44, and extends substantially in a circumferential direction of the sub-gear 40. The curved portion 45b lies at a position little farther from the axial center of the sub-gear 40 than the leading portion 45a. The bending portion 45c is positioned at the end of the narrow-width portion 45, and extends in a direction to approach the axis of the sub-gear 40 from the connecting point between the curved portion 45b and the bending portion 45c. The bending portion 45c extends substantially straight. The bending portions 45c of the pair of through holes 43, which are symmetrically arranged about the axis of the sub-gear 40, extend substantially parallel to each other.

As can be seen in FIG. 5, which includes a cross sectional view of the sub-gear 40, one of the opposite openings of the bending portion 45c which faces away from the main gear 30, i.e., the right-side opening as viewed in FIG. 5, is formed to have a beveled portion 45d whose width gradually increases in a direction away from the main gear 30, i.e., in a direction to the right as viewed in FIG. 5.

When the main gear 30 and the sub-gear 40 are put together, the pair of engaging protrusions 35 of the main gear 30 are aligned with the wide-width portions 44 of the pair of through holes 43 in the axial direction (the horizontal direction as viewed in FIG. 5), respectively. In a state where the pair of engaging protrusions 35 of the main gear 30 are respectively aligned with the wide-width portions 44 of the pair of through holes 43, if the opposed surfaces of the main gear 30 and the sub-gear 40 are brought near to each other to be finally in contact with each other, the pair of engaging protrusions 35 are inserted into the pair of wide-width portions 44, respectively. At the same time, the cylindrical rib 33 of the main gear 30 is inserted into the circular opening 42 of the sub-gear 40 (see FIG. 5). Subsequently, the main gear 30 and the sub-gear 40 are rotated relative to each other in a rotational direction to move the pair of engaging protrusions 35 to the ends of the pair of through holes 43, i.e., the ends of the narrow-width portions 45, respectively. Such a rotational direction corresponds to the counterclockwise direction of the main gear 30 as viewed in FIG. 2 or the clockwise direction of the sub-gear 40 as viewed in FIG. 3. In this rotating operation, only one of the main gear 30 and the sub-gear 40 can be rotated relative to the other. This relative rotation of the main gear 30 and the sub-gear 40 causes the cylindrical base portions 35a to be disengaged from the wide-width portions 44 to be engaged in the narrow-width portions 45, respectively. However, the end surface of the large-diameter ends 35b of each engaging protrusion 35 does not project from the outer surface of the sub-gear 40 (the right surface of the sub-gear 40 as viewed in FIG. 5).

As shown in FIG. 5, since the width of the narrow-width portion 45 of each through hole 43 is determined so as not to allow the large-diameter end 35b to be inserted in the narrow-width portion 45, moving the pair of engaging protrusions 35 into the leading portions 45a of the pair of through holes 43, respectively, causes the large-diameter end 35b of each engaging protrusion 35 to be engaged in the beveled portion 45d of the narrow-width portion 45 of the associated through hole 43 to thereby prevent the main gear 30 and the sub-gear 40 from being disengaged from each other in the axial direction (the horizontal direction as viewed in FIG. 5). Thereafter, the large-diameter ends 35b of the two engaging protrusions 35 remain engaged with the beveled portions 45d of the two narrow-width portions 45, respectively, unless the two engaging protrusions 35 are moved back into the wide-width portions 44, respectively. Namely, the engagement of the main gear 30 with the sub-gear 40 in the axial direction of the idler gear 20 is maintained unless the two engaging protrusions 35 are moved back into the wide-width portions 44, respectively. Once the pair of engaging protrusions 35 are respectively inserted into the leading portions 45a of the pair of through holes 43 in the above described manner, the main gear 30 and the sub-gear 40 are biased in a direction to approach each other via the resilient force of each resilient arm 34.

If the main gear 30 and the sub-gear 40 are further rotated relative to each other, the pair of engaging protrusions 35 (the base portions 35a) move from the leading portions 45a to the curved portions 45b, respectively. When the pair of engaging protrusions 35 (the base portions 35a) pass the curved portions 45b of the pair of through holes 43, respectively, a resistance is applied to each engaging protrusion 35 since the curved portion 45b lies at a position little farther from the axial center of the sub-gear 40 than the leading portion 45a and since the curved portion 45b is provided therein with a stepped portion 45e. If the main gear 30 and the sub-gear 40 are further rotated relative to each other against such a resistance, each resilient arm 34 having the engaging protrusion 35 at its free end is deformed resiliently so that the free end of the resilient art 34 moves radially outwards (in a direction indicated by an arrow "A" in FIG. 2).

Subsequently, the engaging protrusion 35 of each resilient arm 34 enters the corresponding bending portion 45c. Upon entering the bending portion 45c across the curved portion 45b, the engaging protrusion 35 of each resilient arm 34 is released from being pushed radially outwards. This returns the pair of resilient arms 34 back to their normal shapes as shown in FIG. 4. In this state (free state) shown in FIG. 4, the main gear 30 and the sub-gear 40 are not disengaged from each other in the axial direction since the engaging protrusions 35 of the pair of resilient arms 34 are respectively engaged in the narrow portions 45 of the pair of through holes 43 so that each large-diameter end 35b is prevented from being disengaged from the associated narrow-width portion 45. Moreover, the engaging protrusions 35 remain engaged in the bending portions 45c of the pair of through holes 43, respectively, unless the main gear 30 and the sub-gear 40 are intentionally rotated relative to each other to be disengaged from each other. This is because the main gear 30 and the sub-gear 40 have to be rotated relative to each other against the aforementioned resistance applied to each engaging protrusion 35 when the pair of engaging protrusions 35 pass the curved portions 45b of the pair of through holes 43, respectively, if each engaging protrusion 35 is to return to the wide-width portion 44. Once the main gear 30 and the sub-gear 40 are coupled to each other to be provided as the idler gear 20, the main gear 30 and the sub-gear 40 are not easily disengaged from each other because the curved portions 45b are shaped so that the resistance applied thereto when moving from the bending portion 45c to the leading portion 45a is greater than that when moving from the leading portion 45a to the bending portion 45c (because the angle between the curved portion 45b and the bending portion 45c is greater than the angle between the leading portion 45a and the curved portion 45b in each narrow-width portion 45). In the idler gear 20, the main gear 30 and the sub-gear 40 can move relative to each other by a certain degree in radial directions normal to the axis of the idler gear 20 because the inside diameter of the circular opening 42 is greater than the diameter of the outside diameter of the cylindrical rib 33 by a predetermined amount as mentioned above. Note that the main gear 30 and the sub-gear 40 always maintain in mesh with the motor pinion 16 and the driven gear 23 during any relative movement of the main gear 30 and the sub-gear 40 in a radial direction.

In the state shown in FIG. 4, the engaging protrusion 35 of each resilient arm 34 is prevented from moving to the wide-width portion 44 of the associated narrow-width portion 45 easily due to the curved portion 45b as has been described above. In addition, in the state shown in FIG. 4, the engaging protrusion 35 of each resilient arm 34 does not move into the bending portion 45c of the associated narrow-width portion 45 unless an external force is applied to the engaging protrusion 35. As a result, the relative position between the main gear 30 and the sub-gear 40 is maintained. Namely, in order to move the engaging protrusions 35 to the ends of the bending portions 45c, each resilient arm 34 having the engaging protrusion 35 at its free end needs to be deformed resiliently so that the free end of the resilient art 34 moves radially inwards (in a direction indicated by an arrow "B" in FIG. 2) because each bending portion 45c is orientated so as to include both a component of movement in a circumferential direction of the main gear 30 (i.e., in a substantially circumferential direction of the associated resilient arm 34) and a component of movement in a radially inward direction of the main gear 30. Therefore, the relative position of the main gear 30 and the sub-gear 40 which have been coupled to each other as shown in FIG. 4 is maintained in a state where no external force is applied to the pair of resilient arms 34. At this time, the main gear 30 and the sub-gear 40 are positioned almost coaxially, so that the gap between the inner peripheral surface of the sub-gear in the circular opening 42 and the outer peripheral surface of the cylindrical rib 33 is substantially even. In addition, as can be clearly seen in FIG. 4, the circumferential positions of the radial teeth 31 of the main gear 30 are not coincident with those of the radial teeth 41 of the sub-gear 40. Namely, if the idler gear 20 is in a free state, the radial teeth 31 and the radial teeth 41 overlap each other in the circumferential direction of the idler gear 20. In other words, a phase difference is defined between the radial teeth 31 and the radial teeth 41 with respect to a circumferential direction of the idler gear 20. Therefore, when the idler gear 20 in a free state is viewed from front or rear, the radial teeth 31 and the radial teeth 41 alternately appear in a circumferential direction of the idler gear 20.

Figure 6:
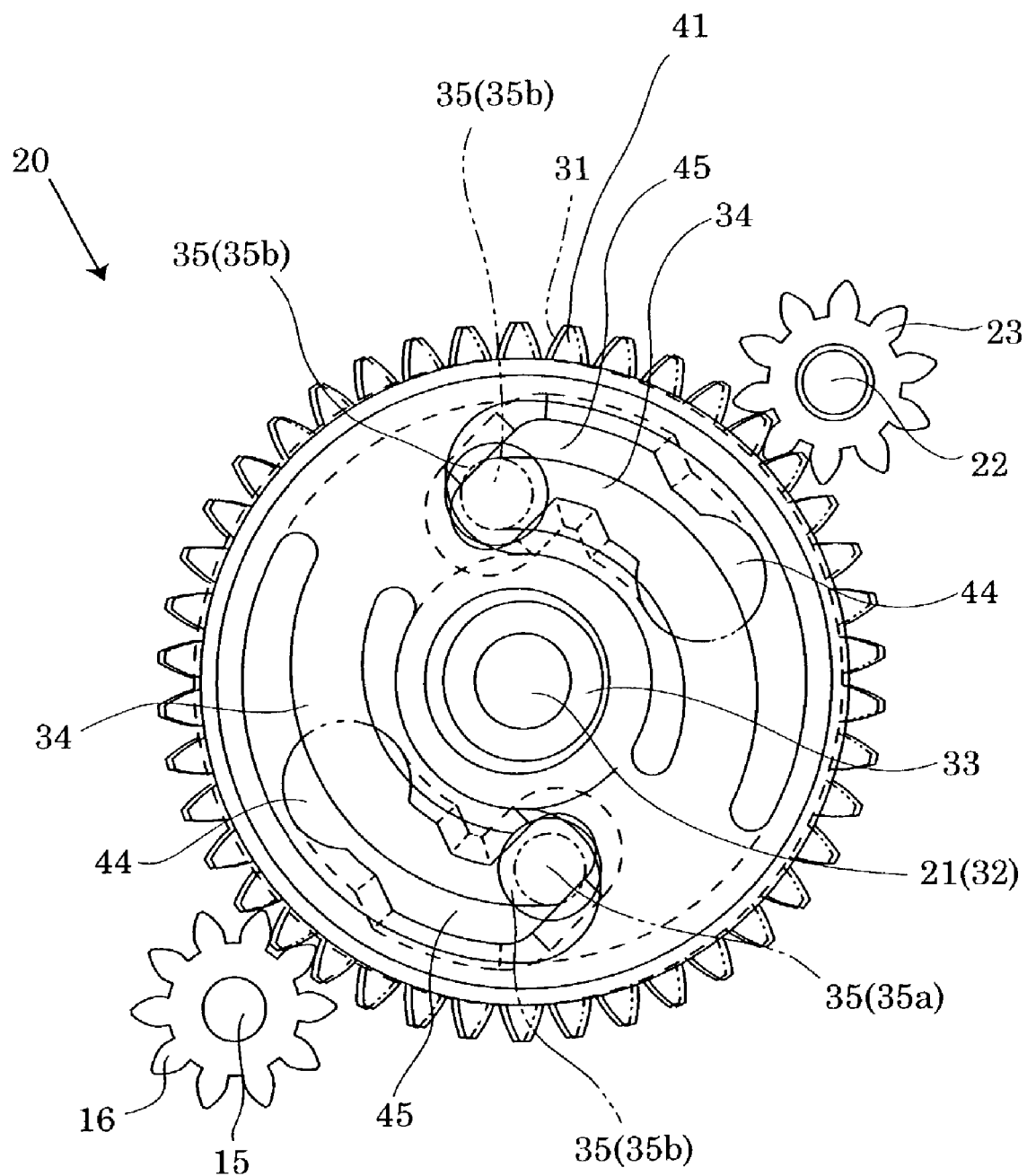
FIG. 6 is a front elevational view of the driving gear, the driven gear and the idler gear in a state where all of the three gears are mounted to the AF unit.

FIG. 6 shows a state where the idler gear 20 is assembled as a single composite gear of FIG. 4, together with the motor pinion 16 and the driven gear 23, and is mounted to the AF unit 1. In this state, the idler gear 20 is positioned in the large accommodation recess 18 with the pivot 21 being fitted in the axial hole 32 of the idler gear 20, while each of the motor pinion 16 and the drive gear 23 is in mesh with the radial gears 31 and 41 of the idler gear 20. Since the circumferential positions of the radial teeth 31 of the main gear 30 are not coincident with those of the radial teeth 41 of the sub-gear 40 as mentioned above, each of the motor pinion 16 and the drive gear 23 needs to be brought into mesh with the radial gears 31 and 41 of the idler gear 20 with the respective tooth traces of the radial gears 31 and 41 being substantially aligned with each other. In order to align the tooth trace of the radial gear 31 with the tooth trace of the radial gear 41, the main gear 30 and the sub-gear 40 are rotated relative to each other about the axis of the idler gear 20 in opposite rotational directions so that each engaging protrusion 35 moves from its position shown in FIG. 4 toward the end of the bending portion 45c of the corresponding narrow-width portion 45. If the main gear 30 and the sub-gear 40 are rotated relative to each other in this manner, each resilient arm 34 having the engaging protrusion 35 at its free end is deformed resiliently so that the free end of the resilient art 34 moves radially inwards (in a direction indicated by the arrow "B" in FIG. 2). This causes the main gear 30 and the sub-gear 40 to be biased to rotate in opposite rotational directions about the axis of the idler gear 20 by resilience of the pair of resilient arms 34 so that each resilient arm 34 returns to its initial position shown in FIG. 4. In this state, if each of the motor pinion 16 and the driven gear 23 is brought into mesh with the radial teeth 31 of the main gear 30 and the radial teeth 41 of the sub-gear 40, the teeth of the motor pinion 16 are clasped between adjacent gears of the radial teeth 31 and 41 that are biased in opposite directions, and at the same time, the teeth of the driven gear 23 are clasped between adjacent gears of the radial teeth 31 and 41 that are also biased in opposite directions, to thereby eliminate backlash between the idler gear 20 and the motor pinion 16 and also backlash between the idler gear 20 and the driven gear 23. In the present embodiment of the gear mechanism, the motor pinion 16 and the driven gear 23 are arranged on opposite sides of the idler gear 20 to be symmetrical with respect to the pivot 21 of the idler gear 20. Due to this configuration, the relative movement of the radial teeth 31 and 41 of the idler gear 20 upon startup of the motor pinion 16 not only eliminates backlash between the idler gear 20 and the motor pinion 16 but also backlash between the idler gear 20 and the driven gear 23 at the same time.

As can be understood from the above description, in the gear mechanism according to the present invention, the pair of resilient arms 34 and the pair of through holes 43, which function as a device for biasing the main gear 30 and the sub-gear 40 in opposite rotational directions, are formed integral with the main gear 30 and the sub-gear 40. Therefore, no spring is necessary in addition to the two adjacent gears (i.e., the main gear 30 and the sub-gear 40), which makes it possible to eliminate backlash in the present embodiment of the gear mechanism at a low cost with no increase in the number of elements of the gear mechanism.

The pair of engaging protrusions 35 (the pair of large-diameter ends 35b) and the pair of through holes 43 serve as a basing device for giving a biasing force to the main gear 30 and the sub-gear 40 so that the main gear 30 and the sub-gear 40 are biased in opposite rotational directions, and at the same time, function as a coupling device for coupling the main gear 30 and the sub-gear 40 to each other in the axial direction of the idler gear 20. In addition, when the idler gear 20 is in an operating state where each engaging protrusion 35 is positioned in the associated bending portion 45c, each engaging protrusion 35 (each cylindrical base portion 35a) positioned in the associated bending portion 45c is prevented from moving to a disassembling position (wherein the main gear 30 and the sub-gear 40 are disengaged from each other) by the associated curved portion 45b to maintain the engagement of the main gear 30 with the sub-gear 40. Accordingly, a structure of the idler gear 20 for eliminating backlash between the idler gear 20 and the motor pinion 16, and backlash between the idler gear 20 and the driven gear 23 also serves as a structure for coupling the main gear 30 and the sub-gear 40 to each other. The idler gear 20 can be handled as a gear unit after the main gear 30 and the sub-gear 40 are coupled to each other, which facilitates parts management of the idler gear 20 and facilitates assembly of the gear mechanism.

Since the main gear 30 and the sub-gear 40 can move relative to each other in radial directions normal to the axis of the idler gear 20, the main gear 30 and the sub-gear 40 not only can rotate relative to each other about the axis of the idler gear 20, but also can move in radial directions relative to each other if necessary to align the respective tooth traces of the radial gears 31 and 41 with each other when each of the motor pinion 16 and the drive gear 23 is brought into mesh with the radial gears 31 and 41 of the idler gear 20. For instance, in a state shown in FIG. 6, the main gear 30 rotates at a fixed position because the main gear 30 is fitted on the fixed pivot 21, whereas the sub-gear 40 is slightly decentered toward the drive shaft 15 of the AF motor 13 from the initial position of the sub-gear 40 shown in FIG. 4. This is because the amount of backlash between the motor pinion 16 and the idler gear 20 is different from the amount of backlash between the driven gear 23 and the idler gear 20. Since the idler gear 20 needs to eliminate at least two different backlashes: the backlash between the motor pinion (driving gear) 16 and the idler gear 20 and the backlash between the driven gear 23 and the idler gear 20, a structure in which the sub-gear 40 of the idler gear 20 rotates at an unfixed position makes it possible to virtually eliminate the two different backlashes at the same time, even if there is a difference in the amount of backlash therebetween by changing the amount of engagement of radial teeth between the idler gear 20 and the motor pinion 16 and the amount of engagement of radial teeth between the idler gear 20 and the driven gear 23. Unlike the illustrated embodiment of the gear mechanism, if the sub-gear 40 rotates at a fixed position about the pivot 21 of the main gear 20, only a fixed amount of backlash can be eliminated in each of the engagement of the motor pinion 16 with the idler gear 20 and the engagement of the driven gear 23 with the idler gear 20 even if the amount of backlash between the motor pinion 16 and the idler gear 20 is different from the amount of backlash between the driven gear 23 and the idler gear 20. In this case, one of the two different backlashes may not be totally eliminated. However, with the structure unique to the idler gear 20 which allows the main gear 30 and the sub-gear 40 to rotate relative to each other about the axis of the idler gear 20, both the backlash between the motor pinion 16 and the idler gear 20 and the backlash between the driven gear 23 and the idler gear 20 can be reliably eliminated.

When the sub-gear 40 moves in a radial direction perpendicular to the axial direction relative to the main gear 30, the pair of resilient arms 34 are deformed resiliently in accordance with the amount of movement of the sub-gear 40 and the direction of movement thereof. A range of radial movement of the sub-gear 40 with respect to the main gear 30 is defined by the gap between the inner peripheral surface of the sub-gear 40 in the circular opening 42 and the outer peripheral surface of the cylindrical rib 33, and is determined in advance to cover the possible maximum difference between the amount of backlash between the motor pinion 16 and the idler gear 20 and the amount of backlash between the driven gear 23 and the idler gear 20 in the radial direction.

As can be understood from the above description, according to the above illustrated embodiment, backlash in a gear mechanism with an idler gear is reliably eliminated with a simple and low-cost structure. Moreover, no spring is necessary in addition to the two adjacent gears (i.e., the main gear 30 and the sub-gear 40), which makes it possible to eliminate backlash not only in a gear mechanism with an idler gear but also in any general gear mechanism at a low production cost. Furthermore, backlash in the gear mechanism can be eliminated with a simple mechanism without electrically controlling the operation of the AF motor. Consequently, a space-efficient motor driving mechanism having a power train using gears including an idler gear is achieved wherein backlash between the gears together with the noise generated by the backlash is eliminated with a low-cost structure.

The present invention is not limited solely to the above described particular embodiment. For instance, although applied to an AF unit of a camera, the above illustrated embodiment of the gear mechanism can also be applied to any other device using a gear mechanism.

As can be understood from the above description, backlash in a gear mechanism having an idler gear is reliably eliminated. Moreover, a low-cost gear mechanism with a device for eliminating backlash between gears with a small number of elements is achieved. Furthermore, a space-efficient motor driving mechanism having a power train using gears wherein backlash between the gears is eliminated with a low-cost structure is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A gear mechanism comprising a driving gear, a driven gear and an idler gear which is in mesh with said driving gear and said driven gear,
   wherein said idler gear includes a first spur gear and a second spur gear which are positioned adjacent to each other in an axial direction and are generally centered about a common axis, radial teeth of said first spur gear and radial teeth of said second spur gear being the same in shape, pitch and the number of teeth;
   wherein said first spur gear and said second spur gear are biased to rotate in opposite directions; and
   wherein said first spur gear and said second spur gear are connected and configured so as to be movable relative to each other by a predetermined amount in a radial direction normal to said axial direction while maintaining said first spur gear and said second spur gear in mesh with said driving gear and said driven gear.

2. The gear mechanism according to claim 1, wherein said first spur gear rotates at a fixed position without moving in a plane normal to the rotational axis thereof, and wherein said second spur gear rotates at an unfixed position relative to said first spur gear in a plane normal to the rotational axis of said first spur gear.

3. The gear mechanism according to claim 2, wherein said first spur gear comprises a cylindrical rib centered about the rotational axis thereof; and
   wherein said second spur gear comprises a circular opening in which said cylindrical rib is loosely fitted, a range of movement of said second spur gear in said radial directions with respect to said first spur gear being defined by a gap between an inner peripheral surface of said second spur gear in said circular opening and an outer peripheral surface of said cylindrical rib.

4. The gear mechanism according to claim 3, wherein said range of movement of said second spur gear is predetermined to cover the possible maximum difference between the amount of backlash between said driving gear and said idler gear and the amount of backlash between said driven gear and said idler gear.

5. The gear mechanism according to claim 1, wherein said driving gear and said driven gear are arranged on opposite sides of said idler gear to be symmetrical with respect to rotational axis of said idler gear.

6. The gear mechanism according to claim 1, wherein said driving gear is driven by a stepper motor.

7. The gear mechanism according to claim 1, wherein said gear mechanism is incorporated in a camera to serve as a backlash eliminating mechanism of an auto-focus system.

8. The gear mechanism according to claim 1, wherein said gear mechanism is incorporated in a focusing lens driving system of a camera.

9. A gear mechanism comprising a driving gear, a driven gear and an idler gear which is in mesh with said driving gear and said driven gear,
wherein said idler gear includes a first spur gear and a second spur gear which are positioned adjacent to each other in an axial direction and are generally centered about a common axis, radial teeth of said first spur gear and radial teeth of said second spur gear being in the same shape, pitch and the number of teeth;
wherein said first spur gear and said second spur gear are biased to rotate in opposite directions; and
wherein said first spur gear and said second spur gear are connected and configured so as to be moveable relative to each other by a predetermined amount in a radial direction normal to said axial direction while maintaining said first spur gear and said second spur gear in mesh with said driving gear and said driven gear,
said gear mechanism further comprising a biasing device which biases said first spur gear and said second spur gear to rotate in said opposite directions, said biasing device comprising:
at least one resilient arm formed on one of said first spur gear and said second spur gear, one end of said resilient end being integral with said one of said first spur gear and said second spur gear, the other end of said resilient arm serving as a free arm, wherein said resilient arm is deformable resiliently in a direction to move said free end in a radial direction; and
at least on arm-engaging recess formed on the other of said first spur gear and said second spur gear so that an engaging protrusion formed on said free end of said resilient arm is engaged in said arm-engaging recess, said arm-engaging recess including a resilient arm bending portion extending in a direction inclined to a circumferential direction of said other of said first spur gear and said second spur gear;
wherein said radial teeth of said first spur gear and radial teeth of said second spur gear overlap each other in a circumferential direction of said idler gear when said idler gear is in a free state when said idler gear is disengaged from said driving gear and said driven gear; and
wherein said free end of said resilient arm moves in said resilient arm bending portion of said arm-engaging recess therealong to deform said resilient arm to thereby bias said first spur gear and said second spur gear to rotate in said opposite directions when said driving gear and said driven gear are brought into mesh with said idler gear with respective tooth traces of said first spur gear and said second spur gear being substantially aligned with each other.

10. The gear mechanism according to claim 9, wherein said first spur gear comprises a pair of said resilient arms, having the same shape and size, which are symmetrically arranged about an axis of said first spur gear, each of said pair of resilient arms being elongated in a circumferential direction of said first spur gear; and
wherein said second spur gear includes a pair of said arm-engaging recesses, having the same shape and size, which are symmetrically arranged about an axis of said second spur gear.

11. The gear mechanism according to claim 9, wherein said arm-engaging recess comprises:
a wide-width portion allowing at least a portion of said engaging protrusion of said resilient arm to be inserted into said arm-engaging recess; and
a narrow-width portion which prevents said engaging protrusion from coming out of said arm-engaging recess, said narrow-width portion including said resilient arm bending portion.

12. The gear mechanism according to claim 9, wherein said resilient arm is resiliently deformable in the axial direction of said first spur gear while maintaining said first spur gear and said second spur gear in mesh with said driving gear and said driven gear.

13. The gear mechanism according to claim 9, wherein said engaging protrusion is positioned in said arm-engaging recess within a thickness of said idler gear in an axial direction thereof in a state wherein said first spur gear and said second spur gear are coupled to each other.

14. A device for eliminating backlash between two gears meshing with each other, wherein one of said two gears is an idler gear which comprises a first spur gear and a second spur gear which are positioned adjacent to each other in an axial direction and generally centered about a common axis, radial teeth of said first spur gear and radial teeth of said second spur gear being identical in shape, pitch and the number of teeth,
wherein said backlash eliminating device comprises a biasing device which biases said first spur gear and said second spur gear to rotate in opposite directions,
said biasing device comprising:
at least one resilient arm formed on one of said first spur gear and said second spur gear, one end of said resilient arm being integral with said one of said first spur gear and said second spur gear, the other end of said resilient arm serving as a free end, wherein said resilient arm is deformable resiliently in a direction to move said free end in a radial direction; and
at least one arm-engaging recess formed on the other of said first spur gear and said second spur gear so that an engaging protrusion formed on said free end of said at least one resilient arm is engaged in said arm-engaging recess, said arm-engaging recess including a resilient arm bending portion extending in a direction inclined to a circumferential direction of said other of said first spur gear and said second spur gear;
wherein said radial teeth of said first spur gear and said radial teeth of said second spur gear overlap each other in a circumferential direction of said idler gear when said idler gear is in a free state wherein said idler gear is disengaged from the other of said two gears; and wherein said free end of said resilient arm moves in said resilient arm bending portion of said arm-engaging recess therealong to deform said resilient arm to thereby bias said first spur gear and said second spur gear to rotate in said opposite directions when the other of said two gears is brought into mesh with said idler gear with respective tooth traces of said first spur gear and said second spur gear being substantially aligned with each other.

15. The backlash eliminating device according to claim 14, wherein said first spur gear comprises a pair of said resilient arms having the same shape and size which are symmetrically arranged about an axis of said first spur gear, each of said pair of resilient arms being elongated in a circumferential direction of said first spur gear; and wherein said second spur gear includes a pair of said arm-engaging recesses having the same shape and size which are symmetrically arranged about an axis of said second spur gear.

16. The backlash eliminating device according to claim 14, wherein said engaging protrusion of said resilient arm comprises:

a cylindrical base portion engaged in said resilient arm bending portion to be movable therein; and a large-diameter end positioned at an end of said cylindrical base portion, said large-diameter end being greater than said cylindrical base portion in diameter, wherein an engagement of said large-diameter end with said resilient arm bending portion and a portion of said arm-engaging recess in the vicinity of said resilient arm bending portion prevents said first spur gear and said second spur gear from disengaging from each other in said axial direction.

17. The backlash eliminating device according to claim 16, wherein said arm-engaging recess further comprises a wide-width portion which communicates with said resilient arm bending portion and which allows said large-diameter end to be inserted in said wide-width portion; and wherein said first spur gear and said second spur gear are disengagable from each other in the axial direction when said large-diameter end is positioned in said wide-width portion.

18. The backlash eliminating device according to claim 17, wherein said arm-engaging recess further comprises a curved portion provided between said wide-width portion and said resilient arm bending portion, said curved portion applying a resistance to said engaging protrusion when said engaging protrusion passes along said curved portion to move from said resilient arm bending portion to said wide-width portion.

19. The backlash eliminating device according to claim 14, wherein said resilient arm is resiliently deformable not only in the radial direction but also in the axial direction.

20. The backlash eliminating device according to claim 14, wherein said first spur gear and said second spur gear are connected so as to be movable relative to each other in a radial direction normal to said common axis while maintaining said first spur gear and said second spur gear in mesh with the other of said two gears.

21. The backlash eliminating device according to claim 20, wherein the other of said two gears includes both a driving gear and a driven gear which are each in mesh with said idler gear.

22. The backlash eliminating device according to claim 21, wherein said driving gear and said driven gear are arranged on opposite sides of said idler gear to be symmetrical with respect to rotational axis of said idler gear.

23. The backlash eliminating device according to claim 14, wherein said two gears is incorporated in a camera.

24. A motor driving mechanism having a driving gear, a driven gear and an idler gear which is in mesh with said driving gear and said driven gear, rotation of said driving gear being transferred to said driven gear via said idler gear, said driving gear being driven by a motor rotation, rotation of said driven gear causing a driven member to move, wherein said idler gear comprises a first spur gear and a second spur gear which are positioned adjacent to each other in an axial direction and generally centered about a common axis, radial teeth of said first spur gear and radial teeth of said second spur gear having the same shape, pitch and the number of teeth;

wherein said first spur gear and said second spur gear are biased to rotate in opposite directions; and wherein said first spur gear and said second spur gear are connected and configured so as to be movable relative to each other by a predetermined amount in a radial direction normal to said axial direction while maintaining said first spur gear and said second spur gear in mesh with said driving gear and said driven gear.

25. The motor driving mechanism according to claim 24, wherein said motor comprises a stepper motor.

26. The motor driving mechanism according to claim 24, wherein said driven member comprises a lens support frame which supports a focusing lens group of a camera.

27. The motor driving mechanism according to claim 24, wherein said driving gear and said driven gear are arranged on opposite sides of said idler gear to be symmetrical with respect to a rotational axis of said idler gear.

28. A motor driving mechanism having a motor and two gears meshing with each other, rotation of said motor being transferred to a driven member via said two gears, wherein one of said two gears is an idler gear which comprises a first spur gear and a second spur gear which are positioned adjacent to each other in an axial direction and generally centered about a common axis, radial teeth of said first spur gear and radial teeth of said second spur gear having the same shape, pitch and the number of teeth;

wherein said motor driving mechanism comprises a biasing device which biases said first spur gear and said second spur gear to rotate in opposite directions, said biasing device including at least one resilient arm formed on one of said first spur gear and said second spur gear, one end of said resilient arm being integral with said one of said first spur gear and said second spur gear, the other end of said resilient arm serving as a free end, wherein said resilient arm is deformable resiliently in a direction to move said free end in a radial direction; and at least one arm-engaging recess formed on the other of said first spur gear and said second spur gear so that an engaging protrusion formed on said free end of said resilient arm is engaged in said arm-engaging recess, said arm-engaging recess including a resilient arm bending portion extending in a direction inclined to a circumferential direction of said other of said first spur gear and said second spur gear;

wherein said radial teeth of said first spur gear and said radial teeth of said second spur gear overlap each other in a circumferential direction of said idler gear when said idler gear is in a free state where said idler gear is disengaged from the other of said two gears; and wherein said free end of said resilient arm moves in said resilient arm bending portion of said arm-engaging recess therealong to deform said resilient arm to thereby bias said first spur gear and said second spur gear to rotate in said opposite directions when the other of said two gears is brought into mesh with said idler gear with respective tooth traces of said first spur gear and said second spur gear being substantially aligned with each other.

29. The motor driving mechanism according to claim 28, wherein said motor comprises a stepper motor.

30. The motor driving mechanism according to claim 28, wherein said driven member comprises a lens support frame which supports a focusing lens group of a camera.

31. An idler gear having a first spur gear and a second spur gear,
said first spur gear comprising an axial cylindrical rib centered about an axis of said first spur gear;
said second spur gear comprising an axial circular opening in which said cylindrical rib is loosely fitted so that said second spur gear is rotatable about said cylindrical rib relative to said first spur gear;
wherein radial teeth of said first spur gear and radial teeth of said second spur gear are the same in shape, pitch and the number of teeth; and
wherein said idler gear includes a biasing device which biases said first spur gear and said second spur gear to rotate in opposite directions,
said biasing device comprising:
at least one resilient arm formed on one of said first spur gear and said second spur gear, one end of said resilient arm being integral with said one of said first spur gear and said second spur gear, the other end of said resilient arm serving as a free end, wherein said resilient arm is deformable resiliently in a direction to move said free arm in a radial direction; and
at least one arm-engaging recess formed on the other of said first spur gear and said second spur gear so that an engaging protrusion formed on said free end of said at least one resilient arm is engaged in said arm-engaging recess, said arm-engaging recess including a resilient arm bending portion extending in a direction inclined to a circumferential direction of said other of said first spur gear and second spur gear;
wherein said radial teeth of said first spur gear and said radial teeth of said second spur gear overlap each other in a circumferential direction of said idler gear when said idler gear is in a free state wherein said idler gear is disengaged from another gear; and
wherein said free end of said resilient arm moves in said resilient arm bending portion of said arm-engaging recess therealong to deform said resilient arm radially to thereby bias said first spur gear and said second spur gear to rotate in said opposite directions when another gear is brought into mesh with said idler gear with respective tooth traces of said first spur gear and said second spur gear being substantially aligned with each other.

32. A gear mechanism comprising a driving gear, a driven gear and an idler gear which is in mesh with said driving gear and said driven gear,
wherein said idler gear includes a first spur gear and a second spur gear which are positioned adjacent to each other in an axial direction and are generally centered about a common axis, radial teeth of said first spur gear and radial teeth of said second spur gear being the same in shape, pitch and the number of teeth;
wherein said first spur gear and said second spur gear are biased to rotate in opposite directions;
wherein said first spur gear and said second spur gear are connected so as to be relatively moveable in a radial direction normal to said axial direction while maintaining said first spur gear and said second spur gear in mesh with said driving gear and said driven gear;
wherein said first spur gear rotates at a fixed position without moving in a plane normal to the rotational axis thereof, and wherein said second spur gear rotates at an unfixed position relative to said first spur gear in a plane normal to the rotational axis of said first spur gear;
wherein said first spur gear comprises a cylindrical rib centered about the rotational axis thereof; and
wherein said second spur gear comprises a circular opening in which said cylindrical rib is loosely fitted, a range of movement of said second spur gear in said radial directions with respect to said first spur gear being defined by a gap between an inner peripheral surface of said cylindrical rib.

33. A gear mechanism comprising a driving gear, a driven gear and an idler gear which is in mesh with said driving gear and said driven gear,
wherein said idler gear includes a first spur gear and a said second spur gear which are positioned adjacent to each other in an axial direction and are generally centered about a common axis, radial teeth of said first spur gear and radial teeth of second spur gear being the same in shape, pitch and the number of teeth;
wherein said first spur gear and said second spur gear are biased to rotate in opposite directions;
wherein said first spur gear and said second spur gear are connected so as to be relatively moveable in a radial direction to said axial direction while maintaining said first spur gear and said second spur gear in mesh with said driving gear and said driven gear;
said gear mechanism further comprising a biasing device which biases said first spur gear and said second spur gear to rotate in said opposite directions, said biasing device comprising:
at least one resilient arm formed on one of said first spur gear and said second spur gear, one end of said resilient arm being integral with said one of said first spur gear and said second spur gear, the other end of said resilient arm serving as a free end, wherein said resilient arm is deformable resiliently in a direction to move said free end in a radial direction; and
at least one arm-engaging recess formed on the other of said first spur gear and said second spur gear so that an engaging protrusion formed on said free end of said resilient arm is engaged in said arm-engaging recess, said arm-engaging recess including a resilient arm bending portion extending in a direction inclined to a circumferential direction of said other of said first spur gear and said second spur gear;
wherein said radial teeth of said first spur gear and said radial teeth of said second spur gear overlap each other in a circumferential direction of said idler gear when said idler gear is in a free state when said idler gear is disengaged from said driving gear and said driven gear; and
wherein said free end of said resilient arm moves in said resilient arm bending portion of said arm-engaging recess therealong to deform said resilient arm to thereby bias said first spur gear and said second spur gear to rotate in said opposite directions when said driving gear and said driven gear are brought into mesh with said idler gear with respective tooth traces of said first spur gear and second spur gear being substantially aligned with each other.

* * * * *